(12) United States Patent
Kim

(10) Patent No.: US 9,422,174 B2
(45) Date of Patent: Aug. 23, 2016

(54) CARTRIDGE FOR CREATING STERILIZED WATER HAVING HOLE FOR INSERTING AND TAKING OUT WATER IN ONE DIRECTION

(71) Applicant: Man-Geun Kim, Anyang-si (KR)

(72) Inventor: Man-Geun Kim, Anyang-si (KR)

(73) Assignee: GRENTECH CO., LTD., Incheon (KR)

( * ) Notice: Subject to any disclaimer, the term of this patent is extended or adjusted under 35 U.S.C. 154(b) by 305 days.

(21) Appl. No.: 13/630,140

(22) Filed: Sep. 28, 2012

(65) Prior Publication Data
US 2014/0061037 A1      Mar. 6, 2014

(30) Foreign Application Priority Data

Aug. 29, 2012  (KR) .................. 10-2012-0094900

(51) Int. Cl.
*C02F 1/461* (2006.01)
*C02F 1/467* (2006.01)

(52) U.S. Cl.
CPC ....... *C02F 1/4672* (2013.01); *C02F 2201/4611* (2013.01); *C02F 2201/46115* (2013.01); *C02F 2201/46155* (2013.01); *C02F 2209/02* (2013.01)

(58) Field of Classification Search
None
See application file for complete search history.

(56) References Cited

U.S. PATENT DOCUMENTS

| 4,279,716 | A * | 7/1981 | Horst et al. ................. 204/229.4 |
| 5,043,050 | A * | 8/1991 | Herbst .......................... 204/272 |
| 6,325,916 | B1 * | 12/2001 | Lambert et al. ............... 205/751 |
| 7,048,842 | B2 * | 5/2006 | Tremblay et al. ............. 205/499 |
| 2005/0067300 | A1 * | 3/2005 | Tremblay ..................... 205/742 |
| 2006/0186058 | A1 | 8/2006 | Kim |
| 2010/0224483 | A1 * | 9/2010 | Cho ............................. 204/222 |
| 2014/0054166 | A1 * | 2/2014 | Brandon et al. ........... 204/275.1 |

FOREIGN PATENT DOCUMENTS

| WO | WO 2007/022572 A1 * | 3/2007 |
| WO | WO 2009/128579 A1 | 10/2009 |
| WO | WO 2012/049512 A2 * | 4/2012 |

* cited by examiner

*Primary Examiner* — Harry D Wilkins, III
(74) *Attorney, Agent, or Firm* — Revolution IP, PLLC

(57) ABSTRACT

The present disclosure relates to a sterilized water creating cartridge having an inlet and an outlet in one direction for producing sterilized water by underwater-discharging water supplied from an inlet and discharging the sterilizes water to an outlet, the cartridge including a sterilized water producing unit including a negative electrode plate having an electrode connector for underwater-discharging the water, and a positive electrode plate, and a case accommodating the sterilized water producing unit thereinside, formed with an electrode connector through hole passing the electrode connector, and having an inlet and an outlet on a surface of one direction toward both sides of the sterilized water producing unit.

11 Claims, 8 Drawing Sheets

CARTRIDGE FOR CREATING STERILIZED WATER HAVING HOLE FOR INSERTING AND TAKING OUT WATER IN ONE DIRECTION

Pursuant to 35 U.S.C. §119 (a), this application claims the benefit of earlier filing date and right of priority to Korean Patent Application No. 10-2012-0094900, filed on Aug. 29, 2012, the contents of which are hereby incorporated by reference in their entirety.

BACKGROUND OF THE DISCLOSURE

1. Field of the Disclosure

The present disclosure relates to a cartridge for creating sterilized water, and more particularly to a cartridge for creating sterilized water (hereinafter referred to as "sterilized water producing cartridge") having an inlet for inserting the water and an outlet for taking out the water in one direction, and configured to realize various types of sterilized water creating products.

2. Discussion of the Related Art

The information disclosed in this Discussion of the Related Art section is only for enhancement of understanding of the general background of the present disclosure and should not be taken as an acknowledgement or any form of suggestion that this information forms the prior art already known to a person skilled in the art.

Concomitant with enhanced living standard due to increased income, people's desire to use cleaner tap (domestic) water for drinking and/or for cleaning purpose, or to use high quality tap water has increased.

To this end, various devices capable of sterilizing and/or purifying the tap water have been proposed in response to increased interest in purification and sterilization of tap water. In general, purifying operation is performed by using various filters, and sterilizing operation is largely realized by using sterilization devices using chlorine chemical disinfectants, or ozone, UV (ultraviolet) or ultrasonic wave.

Meanwhile, conventional sterilization devices suffer from disadvantages of requiring additional filtering processes due to sterilization by adding disinfectants, in case of using the chemical disinfectants, and also requiring a separate device capable of generating ozone or UV, thereby making the devices complicated and increasing installation costs.

In order to improve the conventional disadvantages, a sterilized water generating device has been disclosed in which sterilized water is used through electrolysis of chlorine ions contained in the tap water, where the sterilized water is produced and used in real time by installing a plurality of barriers inside an electrolyzer to delay or stagnate water flow, and to induce electrolysis of water.

However, the conventional improved sterilized water generating device using the electrolysis still suffers from a disadvantage in that sizes and quantity of electrodes embedded in the electrolyzer for manufacturing excellent sterilized water by electrolyzing the continuously inputted and outputted water increase in proportion to the size of the device. The conventional device still suffers from another disadvantage in that an electric power inputted to the electrodes increases to resultantly increase a power input capacity of a power supply unit.

In addition, the conventional device suffers from still another disadvantage in that a separate barrier is added to unnecessarily increase the size of the device.

Furthermore, most of the conventional cartridges for generating sterilized water has an inlet into which tap water is inputted and an outlet from which the sterilized water is discharged are positioned at mutually opposite direction, whereby there is no way but the sterilized water generating device has a limited awkward structure of being lengthened to one direction.

One known art in the related field, Korean Laid-open Patent No. 2010-0125860 entitled "Sterilized water producing apparatus using electrolysis including a guiding groove formed on an electrolytic tank cover" has been disclosed, wherein the apparatus includes an electrolytic tank formed with an internal space and opened at one side, an electrolytic tank cover formed with an inlet and an outlet for inserting and discharging water to the internal space by opening and closing the opening of the tank, and an electrode formed with a positive electrode plate and a negative electrode plate electrolyzing the water inserted into the tank. The sterilized water producing apparatus using electrolysis is characterized by the electrolytic tank cover formed with a guiding groove communicating with the outlet and protruded in opposition to an inner space of the electrolytic tank.

However, the sterilized water producing apparatus also suffers from disadvantages in that, although the size of the electrode is small to relatively reduce the power supplying capacity, amount of sterilized water generated therefrom is too small, and water flow direction is directed to an upward direction to limit smooth discharge of sterilized water, and the sterilized water is collected at the inner the space to disadvantageously pose a serious problem of polluting the sterilized water.

SUMMARY OF THE DISCLOSURE

This section provides a general summary of the disclosure, and is not a comprehensive disclosure of its full scope or all of its features.

Exemplary aspects of the present disclosure are to substantially solve at least the above problems and/or disadvantages and to provide at least the advantages below.

Accordingly, it is an object of the present disclosure to realize various types of sterilized water producing apparatus formed with an inlet and an outlet in one direction by having the inlet and the outlet formed on a surface of one direction of a case including a sterilized water producing unit.

At the same time, the present disclosure is to sufficiently and continuously supply sterilized water of high concentration by smoothly producing the sterilized water.

It is another object of the present disclosure to provide a sterilized water producing apparatus using electrolysis configured to delay or to stagnate water flow while dispensing with a conventional diaphragm.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a sterilized water creating cartridge having an inlet and an outlet in one direction for producing sterilized water by underwater-discharging water supplied from an inlet and discharging the sterilized water to an outlet, the cartridge comprising: a sterilized water producing unit including a negative electrode plate and a positive electrode plate having an electrode connector for underwater-discharging the water; and a case accommodating the sterilized water producing unit thereinside, formed with an electrode connector through hole passing the electrode connector, and having an inlet and an outlet on a surface of one direction on both sides of the sterilized water producing unit.

In some exemplary embodiments, an electrode separating plate may be interposed between the negative electrode plate and the positive electrode plate for separating the negative electrode plate from the positive electrode plate.

In some exemplary embodiments, the electrode connector may be formed at a periphery of the negative electrode plate and the positive electrode plate.

In some exemplary embodiments, each of the negative electrode plates and the positive electrode plates may be formed with the electrode connector at a mutually different position on a distal end of the sterilized water producing unit.

In some exemplary embodiments, each of the negative electrode plate and the positive electrode plate may be formed with the electrode connector formed by being bent to a same direction, at a mutually different position on a distal end of the sterilized water producing unit.

In some exemplary embodiments, the case may include a bottom case and an upper case, and the sterilized water producing unit is horizontally formed at an inner space formed between the bottom case and the upper case.

In some exemplary embodiments, the sterilized water producing unit may be formed by being closely attached to an inner surface of a case formed with an inlet and an outlet.

In some exemplary embodiments, the inlet may be formed underneath the sterilized water producing unit, while the outlet is formed on the sterilized water producing unit.

In some exemplary embodiments, an electrode plate existing at a side of the inlet in the negative electrode plate and the positive electrode plate of the sterilized water producing unit may take a shape of a flat plate, and an electrode plate existing at a side of the outlet may be formed with a plurality of thin slots.

In some exemplary embodiments, the case may include a plurality of props corresponding to a periphery of the sterilized water producing unit.

In some exemplary embodiments, the plurality of props may taper off in size thereof from one direction formed with the inlet and the outlet to the other direction.

In some exemplary embodiments, the case may include a support supporting the negative electrode plate and the positive electrode plate from bottom and upper sides of the sterilized water producing unit.

In some exemplary embodiments, the case may include a bottom case and an upper case, and each of the bottom and upper cases has a support, and each support formed at the bottom case and the upper case may be formed at a mutually corresponding position.

Other exemplary aspects, advantages, and salient features of the disclosure will become more apparent to persons of ordinary skill in the art from the following detailed description, which, taken in conjunction with the annexed drawings, discloses exemplary embodiments of the present disclosure.

The present disclosure has an advantageous effect in that various types of sterilized water producing apparatuses can be realized that are formed with an inlet and an outlet in one direction by having the inlet and the outlet on a surface of one direction on a case including a sterilized water producing unit.

The present disclosure has another advantageous effect in that production of sterilized water can be smoothly realized to supply sterilized water of high concentration continuously and sufficiently.

The present disclosure has still another advantageous effect in that a conventional methodical structure is improved by relatively reducing a discharge amount of water over an input amount by dispensing with a conventional diaphragm and parallel controlling water flow direction while simultaneously directing the water flow upwards, whereby water flow can be delayed and stagnated to prevent an unnecessary increase in size of the sterilized water producing apparatus.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinafter by way of illustration only, and thus are not limitative of the present disclosure, and wherein.

Figure 1:
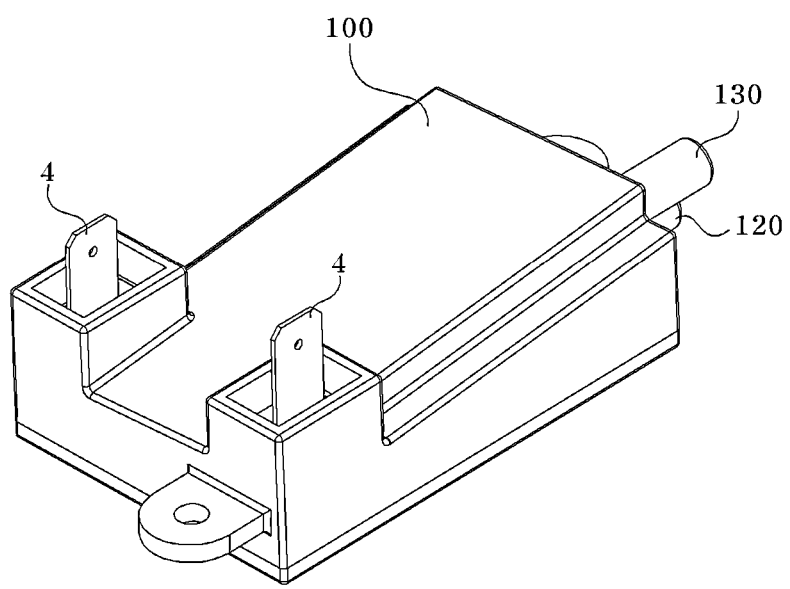
FIG. 1 is a coupled perspective view of a sterilized water producing cartridge according to an exemplary embodiment of the present disclosure.

Additional advantages, objects, and features of the disclosure will be set forth in part in the description which follows and in part will become apparent to those having ordinary skill in the art upon examination of the following or may be learned from practice of the disclosure.

The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably. That is, the terms "-er", "-or", "part" and "module" described in the specification mean units for processing at least one function and operation and can be implemented by hardware components or software components, and combinations thereof.

As used herein, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Hereinafter, exemplary embodiments of the present disclosure will be described in detail with reference to the accompanying drawings.

Figure 2:
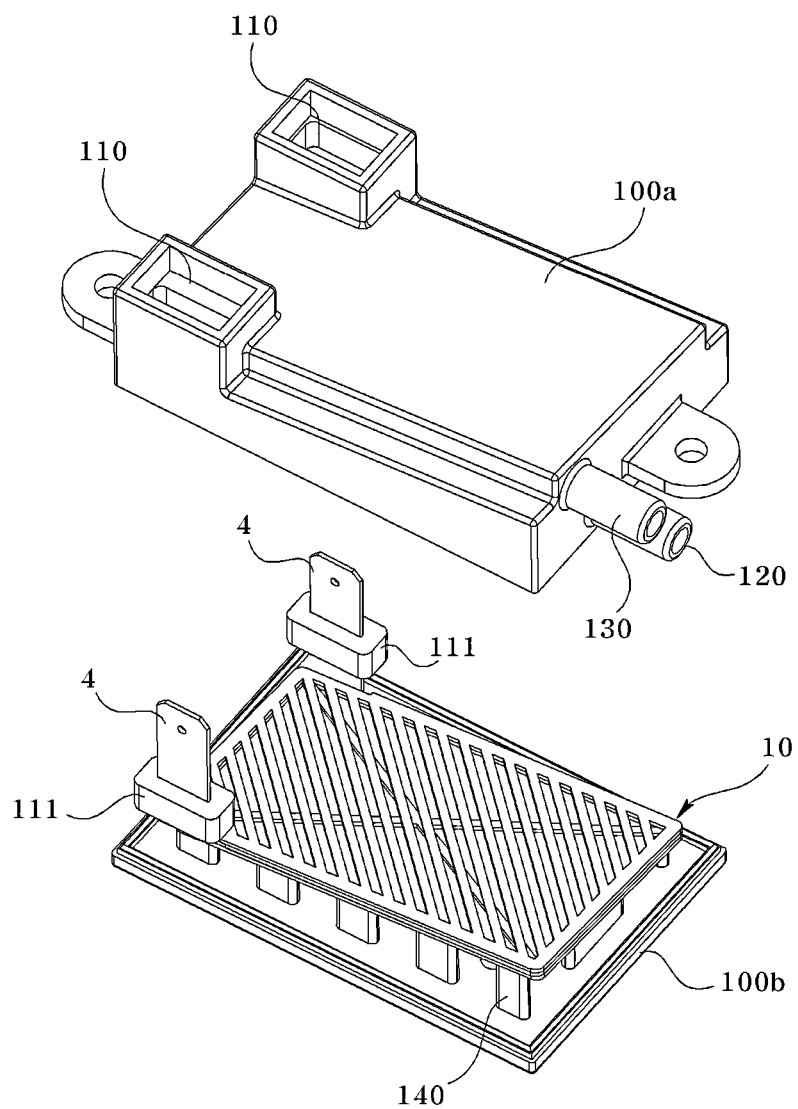
FIG. 2 is a perspective view of an exploded upper case of a sterilized water producing cartridge according to an exemplary embodiment of the present disclosure.
Figure 3:
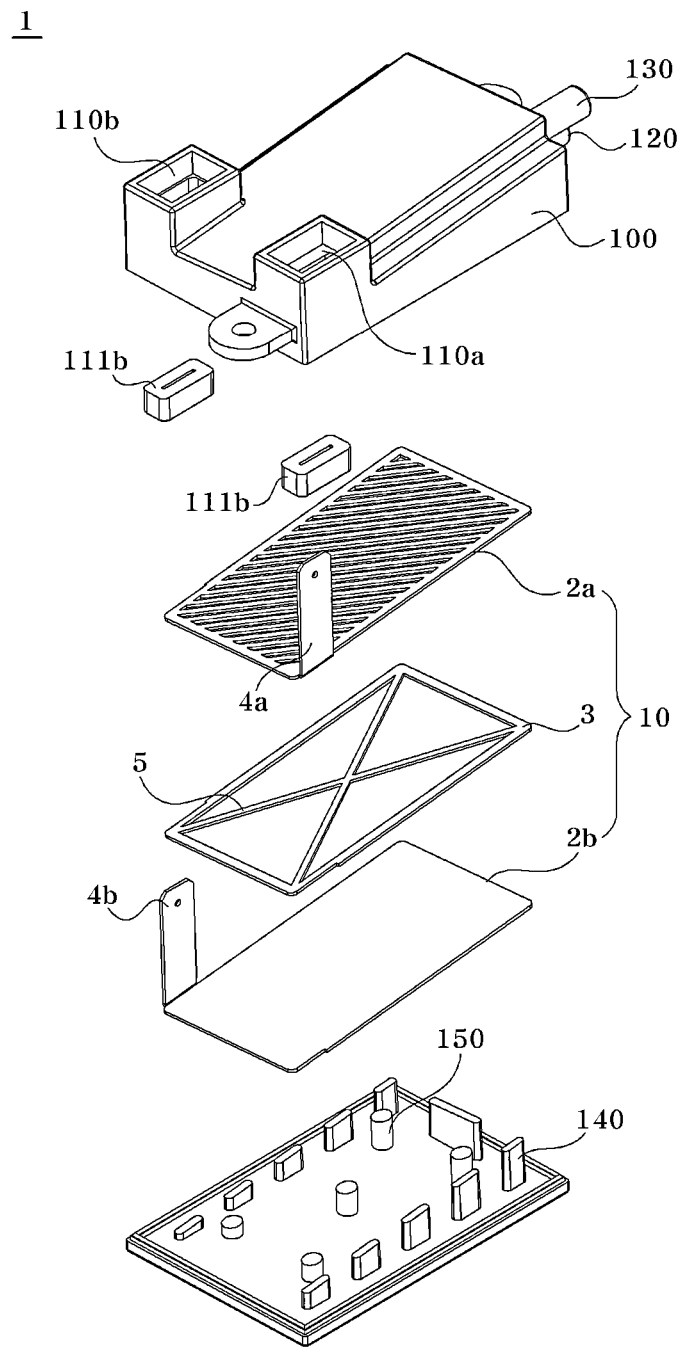
FIG. 3 is a perspective view of an exploded sterilized water producing cartridge according to an exemplary embodiment of the present disclosure.
Figure 4:
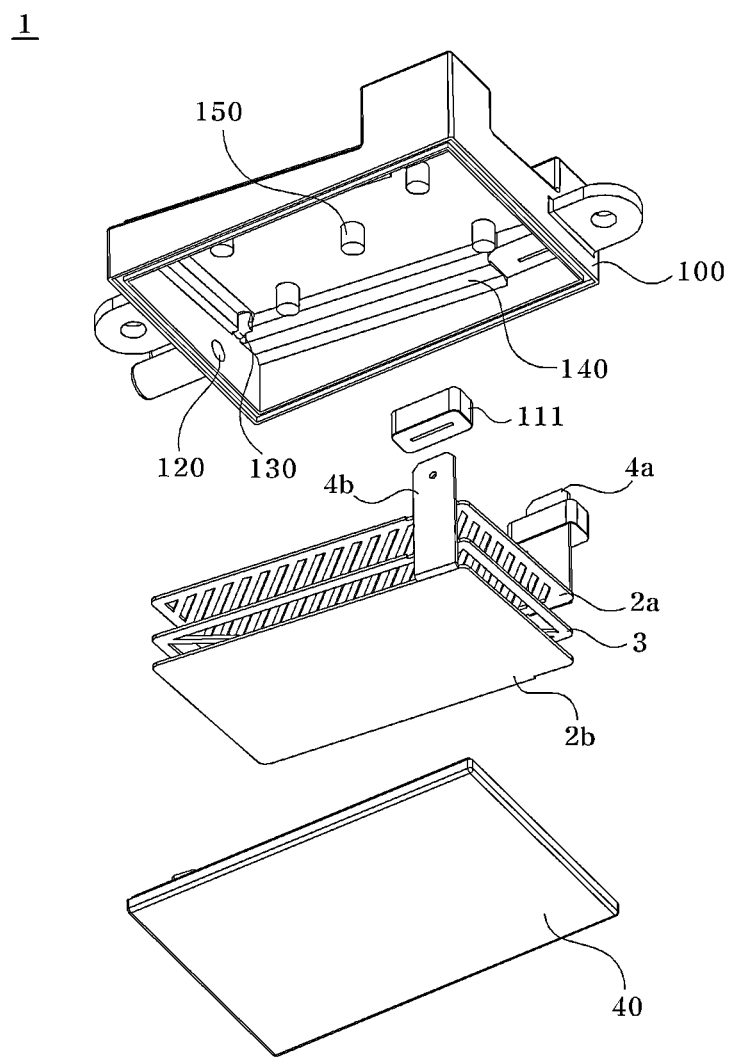
FIG. 4 is an exploded perspective view of a bottom surface of an upper case of a sterilized water producing cartridge according to an exemplary embodiment of the present disclosure.

FIG. 1 is a coupled perspective view of a sterilized water producing cartridge (1) according to an exemplary embodiment of the present disclosure, FIG. 2 is a perspective view of an exploded upper case (100a) of a sterilized water producing cartridge (1) according to an exemplary embodiment of the present disclosure, FIG. 3 is a perspective view of an exploded sterilized water producing cartridge (1) according to an exemplary embodiment of the present disclosure, and FIG. 4 is an exploded perspective view of a bottom surface of an upper case (100a) of a sterilized water producing cartridge (1) according to an exemplary embodiment of the present disclosure.

The present disclosure relates to a sterilized water producing cartridge (1) underwater-discharging the water supplied from an inlet (120) to produce sterilized water, and discharging the sterilized water to an outlet (130). That is, the present disclosure is basically configured such that water is made into plasma ions by electrolysis to generate anions ($O^-$, $O_3^-$, $OH^-$, $HOCl$, $H_2O_2$) capable of killing germs, viruses and bacteria living in the water and removing detergent remnants and pollutants present in the water The sterilized water producing cartridge (1) according to the present disclosure basically includes a sterilized water producing unit (10) producing sterilized water by underwater discharging the water, and a case (100) accommodating the sterilized water producing unit (10) thereinside.

The sterilized water producing unit (10) includes a negative electrode plate and positive electrode plates (2a, 2b) for underwater discharging the water supplied from outside. That is, water molecules are disintegrated by using underwater discharging principle to become mechanism capable of having sterilizing power. The sterilized water producing unit (10) may further include an electrode separating plate (3) between the negative electrode plate and positive electrode plates (2a, 2b) having a diaphragm (5) divisively separating a pair of electrode plates (2). The electrode plate (2) is formed therein with a plurality of long slots, and the water passes the slots to generate the sterilized water through the underwater discharge. The electrode plate (2) includes a structure in which a plurality of negative electrode plates and positive electrode plates (2a, 2b) are alternatively stacked.

A periphery of the electrode plate (2) is formed with a periphery not formed with slots, and the periphery is formed with an electrode connector (4) supplying an electric power to the electrode plate (2). That is, the present disclosure is preferably configured in such a manner that each of the negative electrode plates and positive electrode plates (2a, 2b) is connected by the electrode connectors (4a, 4b) that apply different voltages to the negative electrode plates and positive electrode plates (2a, 2b) to induce underwater discharge between the negative electrode plates and positive electrode plates (2a, 2b). To this end, it suffices for the sterilized water producing unit (10) to have a structure capable of being connected to an outside power source, whereby the electrode connector (4) is connected to the electrode plate (2) to receive an electric power from outside. For example, the electrode connector (4) includes all structures penetrated and protruded to outside of the sterilized water producing cartridge (1) according to the present disclosure, or connected to the outside. Furthermore, the position connected by the electrode connector (4) to the electrode plate (2) is not particularly restricted, and the electrode connector (4) may be formed at any position of the electrode plate (2). However, two electrode connectors (4a, 4b) are preferably formed at mutually different positions of the electrode plate (2) so as not to be contacted by the negative electrode plates and the positive electrode plates (2a, 2b).

More preferably, as shown in FIG. 1, each of the negative electrode plates and the positive electrode plates (2a, 2b) has the electrode connectors (4a, 4b) formed by being bent to a same direction on mutually different positions from a distal end of the sterilized water producing unit (10). That is, in a case the electrode connectors (4a, 4b) are formed at mutually opposite positions on the distal ends of the negative electrode plates and the positive electrode plates (2a, 2b), it is easy to connect the sterilized water producing cartridge (1) made therefrom to an outside electric power source. In addition, in a case the electrode connectors (4a, 4b) are formed by being bent to a same direction, the outside electric power source can be supplied to any direction of the sterilized water producing cartridge (1), whereby various designs can be implemented according to a manufacturer's intention and shape of the product.

The case (100) accommodates the sterilized water producing unit (10) at an inner center region, and is formed with an electrode connector through hole (110) passing the electrode connector (4) to outside, and a surface of a direction is characterized by an inlet (120) and an outlet (130) formed at both sides of the sterilized water producing unit (10).

To be more specific, the case (100) may be formed by a bottom case (100b) and an upper case (100a) for easy separation and assembly, and accommodates the sterilized water producing unit (10) at an inner center region. The reason of the case (100) accommodating the sterilized water producing unit (10) at an inner center region in the present specification means that the sterilized water producing unit (10) is not in a position directly contacting an inner upper surface and a floor surface but has a predetermined space between the upper surface and the floor surface. Thus, water and sterilized water can move through the space existing between the sterilized water producing unit (10) and the inner upper surface and the floor surface of the case (100).

That is, the sterilized water producing unit (10) according to the present disclosure is positioned at an inner middle space of the case (100) to divide the inner space into two sections, through which the water can be introduced and the sterilized water can be discharged. In view of this structure, it is preferable that fluid at the space partitioned inside the case (100) be allowed to communicate under all circumstances. For example, fluid may communicate through slots of the electrode plate (2), and the fluid may communicate through the otherwise other surface side, because the sterilized water producing unit (10) contacts only one lateral surface of the inside of the case (100). Preferably, the sterilized water producing unit (10) divides the inner space of the case (100) into an upper space and a bottom space, whereby the water and the sterilized water can horizontally flow to more effectively produce the sterilized water in a larger quantity than the water and the sterilized water vertically flow.

In addition, the case (100) according to the present disclosure includes an electrode connector through hole (110) that allows the electrode connector (4) to pass through. The electrode connector through hole (110) serves to connect the electrode connector (4) connected to the electrode plate (2) to an outside of the cartridge (1) according to the present disclosure, and has a substantially same cross-sectional area as that of the electrode connector (4), or may be a hole a little larger than the electrode connector (4). However, a position or shape thereof is not limited. As illustrated in FIG. 3, if the electrode connector through hole (110) is formed on a direction perpendicular to the inlet/outlet (120, 130), instead of being positioned on a same surface as that formed by the inlet/outlet (120, 130), or of being positioned on a surface not parallel thereto, a more compact and compressively structured sterilized water producing apparatus can be manufactured.

Figure 6:
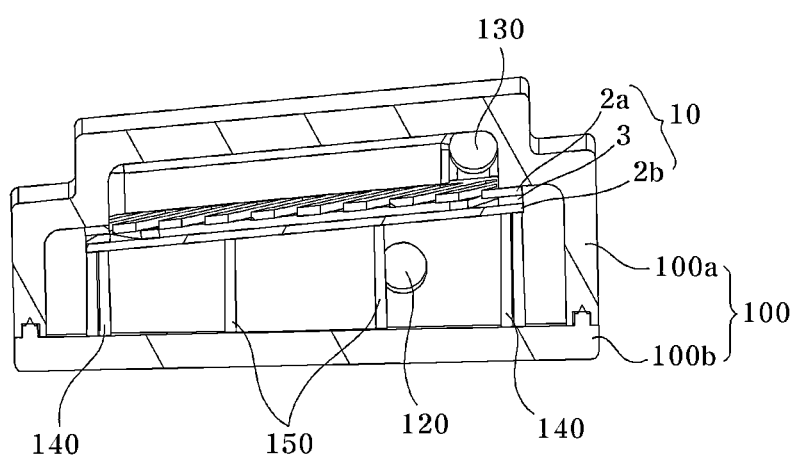
FIG. 6 is a cross-sectional view of 'B' part of FIG. 5.

Furthermore, the present disclosure is characterized by the inlet (120) and the outlet (130) at both sides of the sterilized water producing unit (10) on a surface of one direction of the case (100). That is, the inlet/outlet (120, 130), as illustrated in FIGS. 1 to 4, is preferred to be formed to one direction of the case (100) or on one surface altogether, and at the same time, the inlet/outlet (120, 130) are characteristically formed at both sides divided inside the case (100) by the sterilized water producing unit (10). For example, as shown in FIG. 6, the inlet/outlet (120, 130) is formed inside the case (100) at spaces facing each other about the sterilized water producing unit (10). As apparent from the foregoing, the present disclosure is configured such that the inlet/outlet (120, 130) are formed at both sides of the sterilized water producing unit (10), whereby the incoming water can be converted to sterilized water by electrolysis of the sterilized water producing unit (10) and discharged.

Thus, in a case water is introduced through the inlet (120) formed at one side of the sterilized water producing unit (10) according to the present disclosure, sterilized water can be produced by electrolysis of the introduced water by the sterilized water producing unit (10), and the sterilized water thus produced can be discharged through the outlet (130) formed at the other side of the sterilized water producing unit (10). The present disclosure is such that both the inlet/outlet (120, 130) are formed at one surface of one direction of the case (100) included with the sterilized water producing unit (10), whereby it is possible to manufacture various types of sterilized water producing apparatuses formed with the inlet/outlet (120, 130) to one direction, and at the same time, there is an advantageous effect in that a similar size of electrode plate (2) to that of a conventional electrode plate is used to smoothly and continuously produce the sterilized water of high concentration.

Furthermore, it is preferable in the present disclosure that, in the course of the case (100) accommodating the sterilized water producing unit (10) thereinside, the case be structurally in tight contact with a lateral surface of the sterilized water producing unit (10) at an inner side where the inlet/outlet (120, 130) are formed. That is, the lateral surface of the sterilized water producing unit (10) is fixed in line with the inner side of the case (100) to thereby prevent the water from passing through in a tightly structured configuration.

Figure 5:
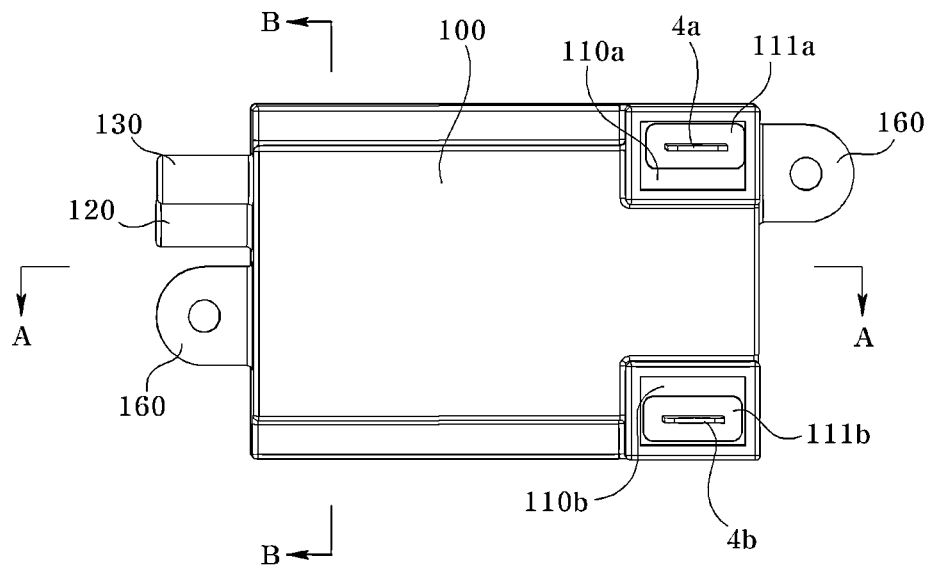
FIG. 5 is a front view of a sterilized water producing cartridge according to an exemplary embodiment of the present disclosure.
Figure 7:
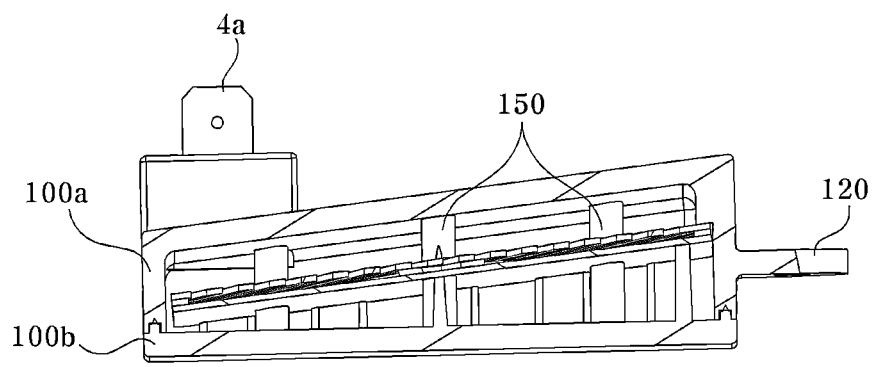
FIG. 7 is a cross-sectional view of 'A' part of FIG. 5.
Figure 8:
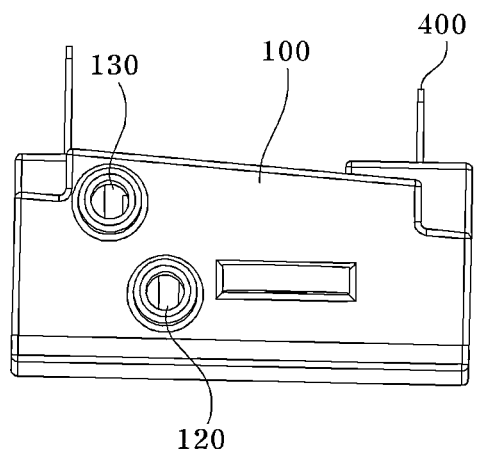
FIG. 8 is a lateral view of a sterilized water producing cartridge according to an exemplary embodiment of the present disclosure.

Meanwhile, FIG. 5 is a front view of a sterilized water producing cartridge according to an exemplary embodiment of the present disclosure, FIG. 6 is a cross-sectional view of 'B' part of FIG. 5, FIG. 7 is a cross-sectional view of 'A' part of FIG. 5, and FIG. 8 is a lateral view of a sterilized water producing cartridge according to an exemplary embodiment of the present disclosure.

Other characteristics of the present disclosure will be described with reference to FIGS. 1 to 8.

The present disclosure is characterized by the inlet/outlet (120, 130) formed at both sides (upper and lower or bottom sides) of the sterilized water producing unit (10) on a surface of one direction, where the inlet/outlet (120, 130) may be formed at upper and lower sides, or lower and upper sides of the sterilized water producing unit (10). Preferably, as illustrated in FIG. 6, the inlet (120) is formed at the lower side of the sterilized water producing unit (10) and the outlet (130) is formed at the upper side of the sterilized water producing unit (10), and in a case the outlet (130) is formed at the upper side, flow direction of water and the sterilized water can be parallel and simultaneously upwardly controlled to relatively reduce the discharged amount over the introduced amount. By this configuration, water flow can be delayed or stagnated to effectively reduce the size of the sterilized water producing apparatus and to minimize decaying of collected water.

Furthermore, it is preferable that the electrode plate (2b), present on a surface on which the inlet (120) is positioned in the negative electrode plates and positive electrode plates (2a, 2b) of the sterilized water producing unit (10) according to the present disclosure, take the shape of a flat plate, and that the electrode plate (2a), present on a surface on which the outlet (130) is positioned in the negative electrode plates and positive electrode plates (2a, 2b) of the sterilized water producing unit (10) according to the present disclosure, be formed with a plurality of thin slots. For example, as shown in FIG. 3, in a case the inlet (120) is positioned underneath the outlet (130), the positive electrode plate (2b) positioned at a lower side of the sterilized water producing unit (10) takes the shape of a flat plate, and the negative electrode plate (2b) positioned at an upper side of the sterilized water producing unit (10) are formed with a plurality of thin slots. In a case the electrode plate (2b) present on the inlet (120) side takes the shape of a flat plate, a moving path of incoming water can be further elongated to allow water to be evenly dispersed on a larger area between the electrode plate (2), whereby a more effective generation of sterilized water can be implemented.

Furthermore, as apparent from the foregoing, the present disclosure is characterized by the sterilized water producing unit (10) being positioned at an inner center of the case (100), and to this end, the case (100) is preferably included with a plurality of props (140) corresponding to the periphery of the sterilized water producing unit (10). The props (140) may be formed on an inner floor surface of the bottom (lower) case (100b) or at a lateral surface of the bottom case (100b). In a case a plurality of props (140) is arranged in parallel each spaced apart at a predetermined distance, instead of forming one prop, it is possible to move the water and sterilized water more smoothly through the spaces. Referring to FIG. 4, the props (140) may be formed on an inner floor surface, or at a lateral surface of the upper case (100a), and in this case, the prop (140) may take one long shape of protrusion, and a plurality of props (140) may be arranged in parallel each spaced apart at a predetermined distance. In a case the prop is formed with one long protrusion, one or more grooves, holes or cut-outs may be formed to create a fluid path through which the water and the sterilized water can smoothly move.

Figure 9:
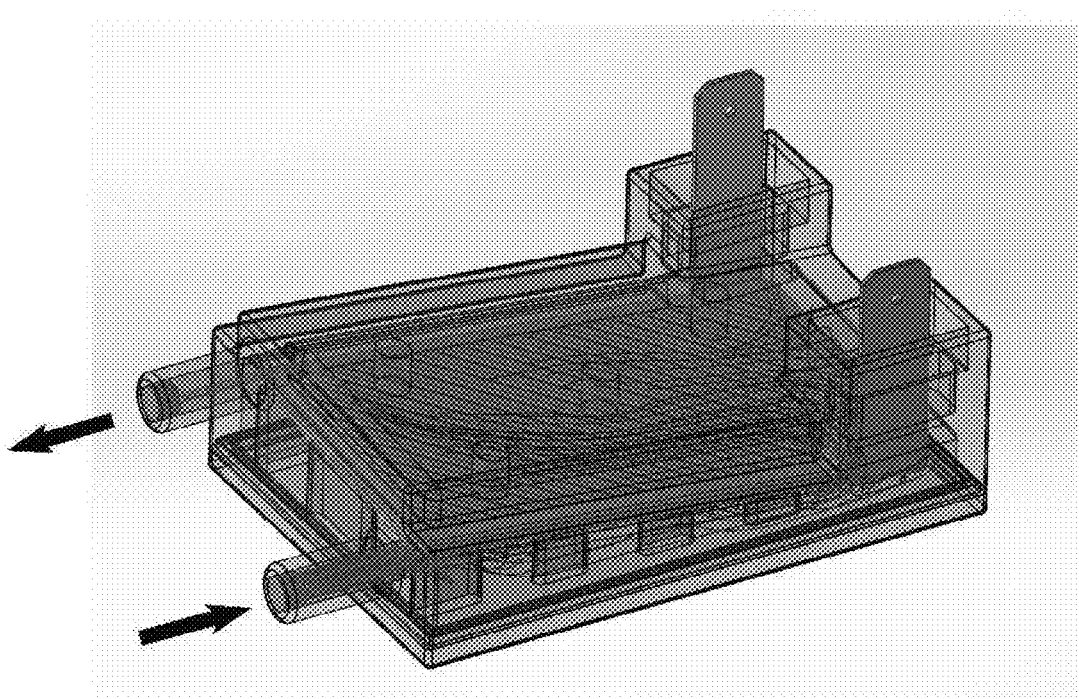
FIG. 9 is an assembled perspective view illustrating a state of water introduced into a sterilized water producing cartridge according to an exemplary embodiment of the present disclosure.
Figure 10:
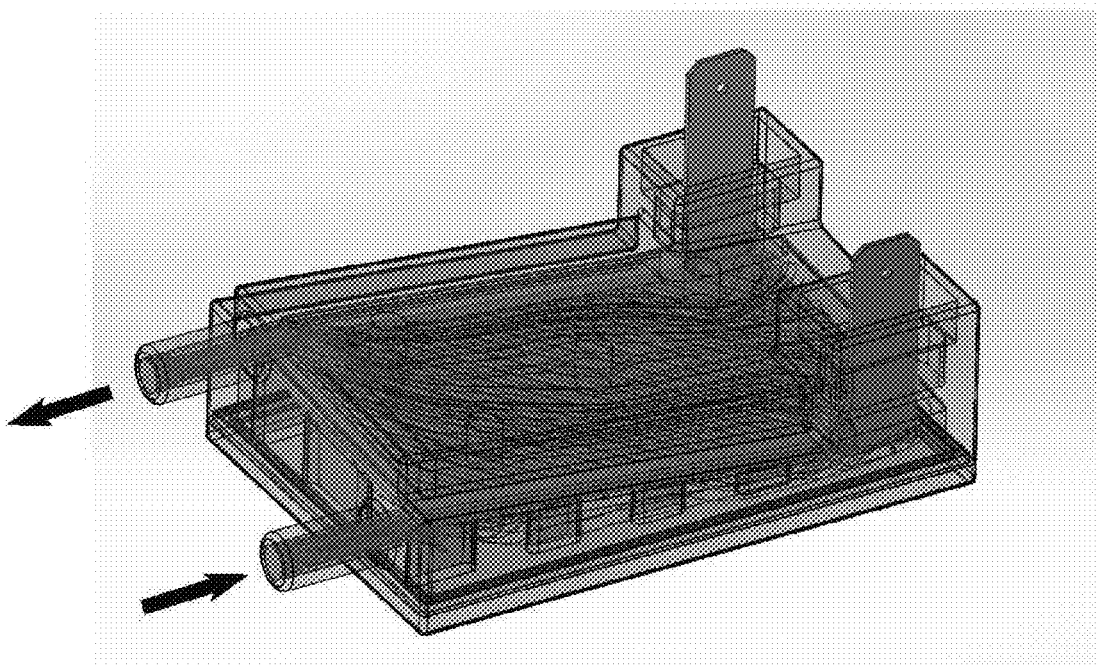
FIG. 10 is an assembled perspective view illustrating a state of water discharged from inside of a sterilized water producing cartridge according to an exemplary embodiment of the present disclosure.

Furthermore, the plurality of props (140) may taper off in size thereof from one direction formed with the inlet/outlet (120, 130) to the other direction. For example, as illustrated in FIG. 3, the prop (140) of a side formed with the inlet/outlet (120, 130) has a height higher than that of the prop (140) of the other side, whereby the sterilized water producing unit (10) placed thereon can be inclined at a predetermined angle. Then, the introduced water can be supplied faster into the case (100), whereby discharge of the sterilized water can be maximally delayed or stagnated for more effective generation of sterilized water (See FIGS. 9 and 10).

In a case the sterilized water producing unit (10) is slanted relative to a direction where the water is supplied, resistance to water flow is lessened, in a case the incoming water contacts the electrode plate (2) included in the sterilized water producing unit (10), to minimize the phenomenon of generating water or air bubbles, whereby efficiency of producing the sterilized water can be enhanced. Furthermore, the inflow water can flow down along the slanted sterilized water producing unit (10) to minimize the phenomenon of being captured thereon.

In addition, the case (100) according to the present disclosure may include a support (150) supporting the negative electrode plates and the positive electrode plates (2a, 2b) from bottom and upper sides of the sterilized water producing unit (10). For example, as illustrated in FIGS. 3 and 4, a bottom surface of an upper case (100a) or an upper surface of a bottom case (100a) may be formed with a plurality of protrusive supports (150) that are brought into contact with the negative electrode plate (2a) or the positive electrode plate (2a). Although a space between the electrode plates (2) present inside the sterilized water producing unit (10) is widened, or irregular to provide a less efficiency in producing the sterilized water according to prior art, the present disclosure can tightly maintain a space between the electrode plates (2) by applying a pressure to the electrode plates (2) from an upper side or from a bottom side through the support (150) positioned in touch with one surface of the sterilized water producing unit (10). To this end, the supports (150) existing on the upper case (100a) and the bottom case (100b) may be oppositely positioned to increase the supporting force of the sterilized water producing unit (10). Furthermore, in a case the diaphragm (5) is formed on the electrode separating plate (3), the support (150) may be formed at a position corresponding to that of the diaphragm (5) to further maximize the supporting force of the sterilized water producing unit (10).

Meanwhile, the sterilized water producing unit (10) according to the present disclosure may further include temperature control means capable of detecting or controlling temperature of the sterilized water producing unit (10).

That is, the temperature control means can increase or decrease the temperature of the electrode plate (2), the water or the sterilized water included inside the sterilized water producing unit (10).

The temperature control means may include any device that can sense the temperature using a current supplied from the outside, or increase/decrease an ambient temperature. For example, a hot wire formed inside or outside of the electrode plate (2) or a frame can increase or decrease the temperature of the electrode plate (2) or an ambient temperature of the electrode plate (2) caused by outside electric power source.

The plasma generated in the electrode plate (2) may be affected by temperature of incoming water, temperature of the electrode plate or ambient temperature thereof, but may be set up with an optimal temperature using the temperature control means.

Furthermore, although the degree of water or air bubbles being formed on the electrode plate (2) may be changed in response to the temperature itself of the electrode plate (2), the phenomenon of the water of the air bubbles being formed can be also minimized by increasing the temperature of the electrode plate (2) using the temperature control means according to the present disclosure.

Still furthermore, the present disclosure may be a sterilized water producing module or a sterilized water producing apparatus including the sterilized water producing unit (10), where a flow guide member guiding the water flow and/or a separate case including the sterilized water producing module and/or the sterilized water producing apparatus may be included.

The above-mentioned sterilized water producing cartridge according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A sterilized water creating cartridge having an inlet and an outlet in one direction for producing sterilized water by underwater-discharging water supplied from an inlet and discharging the sterilized water to an outlet, the cartridge comprising: a sterilized water producing unit including a negative electrode plate and a positive electrode plate having an electrode connector for underwater-discharging the water; and a case accommodating the sterilized water producing unit thereinside, formed with an electrode connector through hole passing the electrode connector, and having an inlet and an outlet on a surface of one direction on both sides of the sterilized water producing unit, wherein the case includes a plurality of props corresponding to a periphery of the sterilized water producing unit; and the plurality of props tapers off in size thereof from one direction formed with the inlet and the outlet to the other direction.

2. The cartridge of claim 1, wherein an electrode separating plate is interposed between the negative electrode plate and the positive electrode plate for separating the negative electrode plate from the positive electrode plate.

3. The cartridge of claim 1, wherein the electrode connector is formed at a periphery of the negative electrode plate and the positive electrode plate.

4. The cartridge of claim 1, wherein each of the negative electrode plates and the positive electrode plates is formed with the electrode connector at a mutually different position on a distal end of the sterilized water producing unit.

5. The cartridge of claim 1, wherein each of the negative electrode plates and the positive electrode plates is formed with the electrode connector formed by being bent to a same direction, at a mutually different position on a distal end of the sterilized water producing unit.

6. The cartridge of claim 1, wherein the case includes a bottom case and an upper case, and the sterilized water producing unit is horizontally formed at an inner space formed between the bottom case and the upper case.

7. The cartridge of claim 1, wherein the sterilized water producing unit is formed by being closely attached to an inner surface of a case formed with an inlet and an outlet.

8. The cartridge of claim 1, wherein the inlet is formed underneath the sterilized water producing unit, while the outlet is formed on the sterilized water producing unit.

9. The cartridge of claim 1, wherein an electrode plate existing at a side of the inlet in the negative electrode plate and the positive electrode plate of the sterilized water producing unit takes a shape of a flat plate, and an electrode plate existing at a side of the outlet is formed with a plurality of thin slots.

10. The cartridge of claim 1, wherein the case includes a support supporting the negative electrode plate and the positive electrode plate from bottom and upper sides of the sterilized water producing unit.

11. The cartridge of claim 10, wherein the case includes a bottom case and an upper case, and each of the bottom and upper cases has a support, and each support formed at the bottom case and the upper case is formed at a mutually corresponding position.

* * * * *